(12) United States Patent
Lee

(10) Patent No.: US 8,005,760 B1
(45) Date of Patent: *Aug. 23, 2011

(54) FEE TRANSACTION SYSTEM AND METHOD FOR INTELLECTUAL PROPERTY ACQUISTION AND/OR MAINTENANCE

(76) Inventor: Eugene M. Lee, Annandale, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/638,196

(22) Filed: Dec. 15, 2009

Related U.S. Application Data

(63) Continuation of application No. 11/334,469, filed on Jan. 19, 2006, now Pat. No. 7,650,288, which is a continuation of application No. 09/460,806, filed on Dec. 14, 1999, now Pat. No. 7,016,852, which is a continuation-in-part of application No. 09/409,524, filed on Sep. 30, 1999, now Pat. No. 7,016,851.

(51) Int. Cl.
*G06Q 50/00* (2006.01)
*G06Q 10/00* (2006.01)
(52) U.S. Cl. .................................. 705/310; 705/1.1
(58) Field of Classification Search .................. 705/1.1, 705/310
See application file for complete search history.

(56) References Cited

U.S. PATENT DOCUMENTS

| | | |
|---|---|---|
| 5,175,681 A | 12/1992 | Iwai et al. |
| 5,623,679 A | 4/1997 | Rivette et al. |
| 5,721,910 A | 2/1998 | Unger et al. |
| 5,737,557 A | 4/1998 | Sullivan |
| 5,754,840 A | 5/1998 | Rivette et al. |
| 5,819,092 A | 10/1998 | Ferguson et al. |
| 5,895,468 A | 4/1999 | Whitmyer, Jr. |
| 5,991,751 A | 11/1999 | Rivette et al. |
| 5,995,947 A | 11/1999 | Fraser et al. |
| 6,029,141 A | 2/2000 | Bezos et al. |
| 6,038,561 A | 3/2000 | Snyder et al. |
| 6,049,811 A | 4/2000 | Petruzzi et al. |

(Continued)

FOREIGN PATENT DOCUMENTS

JP A-10-171843 6/1998

(Continued)

OTHER PUBLICATIONS http://www.inventnet.com, printed Jan. 22, 2003, 5 pages.

(Continued)

*Primary Examiner* — Jonathan Ouellette
(74) *Attorney, Agent, or Firm* — Posz Law Group, PLC

(57) ABSTRACT

A facility has been developed whereby an applicant (or his representative) may initiate performance of an intellectual property service such as the making of a maintenance fee, annuity, renewal, tax or other payments and transact the associated fees coincident therewith. Such a facility has several advantages including the ability to reduce float time. Outside the context of annuity-type payments, similar facilities may be employed in conjunction with preparation, filing and prosecution support tools to similarly transact fees associated with the performance of intellectual property services at or about the time such intellectual property services are performed. An intellectual property portal or hub is employed, which in some realizations is hosted on a public, packet switched data network and communicates with both applicants (or representatives) and associates. In some realizations, the intellectual property portal facilitates selection, by applicants (or representatives) of particular jurisdictions and associates based at least in part on fee quotations made in accordance with particulars of an intellectual property filing and in accordance with fee structures of the particular jurisdictions and foreign associates. In addition, some realizations of the intellectual property filing portal facilitate registration of associate- and jurisdiction-specific services and fee schedules.

16 Claims, 5 Drawing Sheets

U.S. PATENT DOCUMENTS

| | | | |
|---|---|---|---|
| 6,115,690 | A | 9/2000 | Wong |
| 6,154,725 | A | 11/2000 | Donner |
| 6,195,646 | B1 | 2/2001 | Grosh et al. |
| 6,236,972 | B1 | 5/2001 | Shkedy |
| 6,263,314 | B1 | 7/2001 | Donner |
| 6,298,327 | B1 | 10/2001 | Hunter et al. |
| 6,339,767 | B1 | 1/2002 | Rivette et al. |
| 6,385,594 | B1 | 5/2002 | Lebda et al. |
| 6,434,580 | B1 | 8/2002 | Takano et al. |
| 6,499,026 | B1 | 12/2002 | Rivette et al. |
| 6,549,894 | B1 | 4/2003 | Simpson et al. |
| 6,574,645 | B2 | 6/2003 | Petruzzi et al. |
| 6,604,135 | B1 | 8/2003 | Rogers et al. |
| 6,606,744 | B1 | 8/2003 | Mikurak |
| 6,662,178 | B2 | 12/2003 | Lee |
| 6,694,331 | B2 | 2/2004 | Lee |
| 6,789,092 | B1 | 9/2004 | Oppedahl et al. |
| 6,877,137 | B1 | 4/2005 | Rivette et al. |
| 7,016,851 | B1 | 3/2006 | Lee |
| 7,016,852 | B1 | 3/2006 | Lee |
| 7,117,443 | B1 | 10/2006 | Zilka |
| 7,650,288 | B2 | 1/2010 | Lee |
| 2001/0000044 | A1 | 3/2001 | Lin |
| 2002/0035499 | A1 | 3/2002 | Germeraad et al. |
| 2002/0040338 | A1 | 4/2002 | Sick et al. |
| 2002/0059076 | A1 | 5/2002 | Grainger et al. |
| 2002/0069154 | A1 | 6/2002 | Fields |
| 2002/0073095 | A1 | 6/2002 | Ohga |
| 2002/0082778 | A1 | 6/2002 | Barnett et al. |
| 2002/0091542 | A1 | 7/2002 | Grainger |
| 2002/0093528 | A1 | 7/2002 | Grainger |
| 2002/0111824 | A1 | 8/2002 | Grainger |
| 2002/0116363 | A1 | 8/2002 | Grainger |
| 2002/0138297 | A1 | 9/2002 | Lee |
| 2002/0138474 | A1 | 9/2002 | Lee |
| 2002/0143760 | A1 | 10/2002 | Kim et al. |
| 2002/0161733 | A1 | 10/2002 | Grainger |
| 2003/0046307 | A1 | 3/2003 | Rivette et al. |
| 2003/0191654 | A1 | 10/2003 | Panchal |
| 2004/0230574 | A1 | 11/2004 | Kravets |
| 2006/0259321 | A1 | 11/2006 | Gabrick et al. |
| 2007/0005374 | A1 | 1/2007 | Harkin |
| 2009/0307577 | A1 | 12/2009 | Lee |
| 2009/0327005 | A1 | 12/2009 | Lee |

FOREIGN PATENT DOCUMENTS

| | | |
|---|---|---|
| JP | A-11-039394 | 2/1999 |
| JP | A-11-134399 | 5/1999 |
| WO | WO 98/26343 | 6/1998 |

OTHER PUBLICATIONS http://www.inventnet.com, printed Jan. 21, 2003, 11 pages.
http://www.lloydwise.com, printed Jan. 21, 2003, 21 pages.
Lasinski, M. And D. Davison, "Systems & Tools for Visualizing & Organizing IP Portfolios to Meet Business & Licensing Objectives," LES Annual Meeting, San Antonio, Texas, Oct. 27, 1999, 18 sheets.
Lucas, Carl, "Visualization of Intellectual Property: Visualization Framework, Patent Maps, Patent Trees," LES Annual Meeting, San Antonio, Texas, Oct. 27, 1999, 19 sheets.
Aureka 7.0: Open Platform for Intellectual Property Asset Management, materials distributed at 1999 LES Annual Meeting, San Antonio, Texas, Oct. 24-27, 1999, 18 pages.
Pruzin, Daniel, "WIPO Outlines Nine-Point Agenda for Tackling IP Protection on Internet," *Electronic Commerce & Law Report*, vol. 4, No. 36, BNA, Sep. 22, 1999, pp. 849-850.
Tapling, Peter, Aurigin, Presentation at Licensing Executives Society Michigan Chapter Meeting, Sep. 17, 1999, 32 pages.
Computer Packages, Inc., CPI Homepage, http://www.computerpackages.com, printed Jul. 28, 1999, 14 pages.
Herhold, Scott, "Patent War Pending: Once-arcane field emerges as battleground between online start-ups and established companies," *San Jose Mercury News*, Jul. 18, 1999, pp. 1-7.
Lovett, Wayne J., "Choosing the Right IP Software," *IP Worldwide*, Mar./Apr. 1999, pp. 31-34.
Lovett, Wayne J., "Special Report: The New Essentials for Managing IP: Choosing the Right IP Software," *IP Worldwide*, Mar./Apr. 1999, 11 pages.
Stephens, Keith, "Creating and Implementing the IP Plan," *IP Worldwide*, Mar./Apr. 1999, pp. 35-37.
"EPC & PCT forms," http://web.archive.org/web/19980703181993/www.epo.co.at/eop/formul/index.htm, printed Mar. 24, 2004, 11 pages.
"PTO Forms," http://web.archive.org/web/19900128095111/www.uspto.gov/web/forms, printed Mar. 24, 2004, 5 pages.
Stephens, Keith, "Creating and Implementing the IP Plan," *IP Worldwide*, Mar./Apr. 1999, 7 pages.
Woodbridge, Richard C. and Paul A. Gardon, "Selecting an IP Docket Management System," *Intellectual Property Today*, Jan. 1999, pp. 25-27.
http://web.archive.org/web/19980224075432/www.lightlink.com/bbm/, printed Mar. 24, 2005, 28 pages.
PCT-Easy, User Reference Manual, PCT-EASY V 2.80, WIPO (www.wipo.int/) Jan. 1999.
"Enabling the Virtual Enterprise: the Supply Chain Meets the Demand Chain," The Yankee Group, 1998.
http://web.archive.org/web/19981206010357/www.inventnet.com, printed Mar. 24, 2004, 11 pages.
Vollendorf, Stefanie, "IP Docketing Software—A Practical Tool," *Intellectual Property Today*, May 1998, pp. 54-56 and 58.
Dutton, Gail, "Protecting Intellectual Property," *Chemical Market Reporter*, Mar. 23, 1998.
http://web.archive.org/web/19961219063059/http://www.inventnet.com, printed Nov. 7, 1996, 14 pages.
Forstner, James A. "Managing international patent litigation," *Managing Intellectual Property Litigation Yearbook*, 1995, pp. 3-6.
Stallings, William, Ph.D., "*Computer Organization and Architecture*", MacMillan Publishing Company, 1993, preface and contents, pp. iii-x.
Spohn, Darren L. "*Data Network Design*", McGraw-Hill, Inc., 1993, contents and preface, pp. vii-xxx.
Gitlin, Richard D., Jeremiah F. Hayes, and Stephen B. Weinstein, "*Data Communications Principles*", Plenum Press, 1992, preface and contents, pp. vii-xix.
Green, James Harry, "*The Irwin Handbook of Telecommunications*", Irwin Professional Publishing, 2d ed., 1992, preface and table of contents, pp. iii-xv.
Gisler et al., eGovernment Experiences of the Swiss Federal Institute of Intellectual Property, IEEE Database and Expert Systems Applications, 2000 Proceedings, 11th International Workshop, pp. 278-281, Sep. 4-8, 2000.
Cappellini et al., Copyright Protection of Cultural Heritage Multimedia Data through Digital Watermarking Techniques, IEEE Database and Expert Systems Applications, 2000 Proceedings, 11th International Workshop, pp. 935-939. Sep. 4-8, 2000.

FEE TRANSACTION SYSTEM AND METHOD FOR INTELLECTUAL PROPERTY ACQUISTION AND/OR MAINTENANCE

This application is a Continuation of application Ser. No. 11/334,469 filed on Jan. 19, 2006, which is a Continuation of application Ser. No. 09/460,806 filed on Dec. 14, 1999, which is a Continuation-in-Part of application Ser. No. 09/409,524 Filed on Sep. 30, 1999.

BACKGROUND OF THE INVENTION

1. Field of the Invention

The invention relates generally to information system transactions over a communication network and, more particularly, to systems and methods for transacting fees associated with intellectual property filings and/or events.

2. Description of the Related Art

In an increasingly interrelated world economy, many intellectual property owners seek protection for their intellectual property assets (e.g., as patents, trademarks, copyrights, designs, etc.) in multiple jurisdictions. For example, patent and trademark applications are routinely filed to secure protection of an invention or mark in multiple nations and/or regions. Often, corresponding applications are filed in, or designate, respective jurisdictions. Each application exhibits comparatively minor variations tracing to national, regional or convention requirements and preferences of associated counsel.

Unfortunately, intellectual property filings are prepared and filed in relatively crude fashion considering the advanced technologies that are the focus of many intellectual property practices. For, example, preparation of documents for filing is typically a manual process in most law firms. Even for filings corresponding to a priority filing (e.g., of a PCT international application corresponding to a priority national filing), preparation of documents is typically a manual process. As with most manual processes, mistakes delays and inefficiencies may be introduced.

A common approach for securing international protection for patent and design intellectual property is to prepare and file a priority application to secure a priority date under various international conventions or treaties. Usually, such a priority application is filed in a home country although the priority application may, in some circumstances, be filed elsewhere (typically, in the United States or under an convention in a competent receiving office such as the International Bureau (IB) of the World Intellectual Property Organization (WIPO)). Thereafter, and within the appropriate convention period, multiple national filings may be made, claiming priority of the priority application. International filing conventions such as provided under the Patent Cooperation Treaty (PCT) or by the European Patent Convention (EPC) help to defer an eventual multiplicity of national filings; however, eventually multiple national filings are typically required.

Because of legal requirements for obtaining priority, the substance of national and international filings are typically identical to, or substantially equivalent to the disclosure of the priority applications upon which they are based. Filing papers and formal requirements may vary substantially, however. Accordingly, the act of filing an international, regional or national intellectual property application is typically dominated by logistical challenges such as proper formatting of an application, preparation of formal documents and tiling papers required by a national or regional intellectual property office, legalization of documents in accordance with national requirements, translation requirements, establishment of authority or agency in accordance with national requirements, and fee calculation and transaction issues. These complexities can be exacerbated by the differing procedures and requirements of various foreign associates (e.g., attorneys or agents authorized to practice in a given jurisdiction) with whom a managing attorney or intellectual property owner corresponds.

In short, foreign filing departments of corporations and law firms as well as intellectual property owners are faced with a landscape of national requirements-based and foreign associate-based variations in formal or procedural requirements. In some cases, because of the timing of foreign filing decisions in relation to deadlines, mistakes can be incurable and result in a loss of rights. Also, because of the sheer number of potential combinations, mistakes are easy to make. Furthermore, the effort necessary to maintain up-to-date forms and procedures can be substantial, particularly for multiple jurisdictions and foreign associates.

In part because of these logistical challenges, foreign filing decisions are not often made with particularity. Instead, standard selections of jurisdictions and foreign associates are routinized. Typically, such standard selections are followed with little, if any, consideration for the particulars of the intellectual property, the strengths (and weaknesses) of a particular foreign associate, matter specific implications of fee structures of standard jurisdictions and foreign associate selections, etc. What is needed are tools that facilitate IP portfolio exploitation by empowering decision makers to make and execute particularized filing decisions and thereby better optimize filing strategies.

One major need is for facilities to streamline filing of corresponding applications in multiple jurisdictions using multiple associates while automating the preparation of filings in accordance with jurisdiction- and/or associate-specific requirements and/or procedures. Another need is for facilities that allow fee transactions to be exactly quoted and executed in accordance with particulars of an intellectual property filing and in accordance with fee structures of jurisdictions and foreign associates.

Although these goals are yet to be realized, some useful software tools are beginning to reach the marketplace. For example, EP-EASY (Electronic Application SYstem) software available from the European Patent Office (EPO) enables applicants and their representatives to prepare and submit European patent applications in electronic form by creating an EP-EASY submission diskette. According to the EPO, future versions of the EP-EASY software will provide for the on-line filing of European patent applications; however, no on-line filing is currently provided.

A user of the EP-EASY software enters data into the interactive counterpart of the paper "Request for Grant" form (EPO Form 1001). The user may then "attach" technical documents, i.e., the description, the claims, the abstract and any drawings referred to in the description or claims, which have been independently prepared using an off-the-shelf word-processor and stored in a electronic format such as Portable Document Format (PDF), Rich Text Format (RTF) or ASCII text. The EP-EASY software copies these files to the EP-EASY submission diskette together with the files automatically generated by the EP-EASY software and creates a print-out of the EPO Form 1001E and attached files for filing with the submission diskette.

PCT-EASY (Electronic Application SYstem) software available from the World Intellectual Property Organization (WIPO) is similar and is designed to facilitate the preparation of PCT international applications in electronic form and according to WIPO, ultimately, facilitate the transfer of such applications by electronic means. However, at present, the PCT-EASY software is limited to (1) a Request form module providing for the input and validation of Request form data and the attachment of the abstract in electronic form, (2) printout of a PCT computer generated Request form, which replaces the existing PCT/RO/101 form for the purposes of a PCT-EASY filing, and (3) facilities for copying the PCT-EASY Request form data file and attached abstract to diskette for submission with the complete paper filing.

In the United States, maintenance fees for every U.S. granted patent are due 3½, 7½ and 11½ years after grant in order to keep the patent from being abandoned. In the majority of the foreign countries, annuities are due annually even if the patent is still an application that is being prosecuted. The payment of these fees, in particular the foreign annuities, requires interaction between a docketing application, the law firm, the client, the annuity payment service firm, the foreign associate and the foreign patent office. Due to the inefficiency of this process, clients typically must make their decisions whether to maintain the applications/patents and pay the annuity fees an average of four to six months prior to the actual due date of the fee. Docketing and annuity payment service firms are then able to capitalize on the "float" of the money during this extended time period. Therefore, instead of making this process more efficient and thereby reducing the time period between the receipt of the client's instructions/fees and the payment of the fees, it is in the best interest of the docketing and annuity payment service firms to maintain this lengthy delay.

Software tools to facilitate annuity payments are generally premised on off-line, batch-oriented interactions with a payor. For example, PC Master software (available from Master Data Center, Southfield, Mich.) is illustrative. PC Master extracts patent information from a client's docket database. The client then sends the extracted information to a payor organization (i.e., Master Data Center) via e-mail, diskette or CD. The payor then processes the extracted information and supplies the client with a printed report. The client sends instructions handwritten on the printed report and prepares a second extract. The second extract serves to identify any new matters that have been entered in the client's docket database during the period (typically several months) since the last extract and allows any rules changes made during that period to be reflected in the second extract. The payor then verifies the decisions. At some time in the future, but before payments are due, the payor makes annuity payments in accordance with the client's instructions and sends printed confirmation to the client. The entire process typically requires 6-9 months of back-and-forth correspondence.

SUMMARY OF THE INVENTION

Recognizing the limitations of currently available systems, a facility has been developed whereby an applicant (or his representative) may initiate performance of an intellectual property service such as the making of a maintenance fee, annuity, renewal, tax or other payments and transact the associated fees coincident therewith. Such a facility has several advantages including the ability to reduce float time. Outside the context of annuity-type payments, similar facilities may be employed in conjunction with preparation, filing and prosecution support tools to similarly transact fees associated with the performance of intellectual property services at or about the time such intellectual property services are performed. An intellectual property portal or hub is employed, which in some realizations is hosted on a public, packet switched data network and communicates with both applicants (or representatives) and associates. In some realizations, the intellectual property portal facilitates selection, by applicants (or representatives) of particular jurisdictions and associates based at least in part on fee quotations made in accordance with particulars of an intellectual property filing and in accordance with fee structures of the particular jurisdictions and foreign associates. In addition, some realizations of the intellectual property filing portal facilitate registration of associate- and jurisdiction-specific services and fee schedules.

In one embodiment in accordance with the present invention, a computer implemented method for transacting an intellectual property service includes presenting a user with one or more intellectual property services and associated fees, initiating performance of the selected one or more Services in response to selection by the user of one or more of the intellectual property services, and coincident therewith, transacting the associated one or more fees. In some variations, the intellectual property services include paying an annuity or maintenance fee, making an intellectual property filing on behalf of the user, or preparing target jurisdiction- and associate-specific form documents. In some variations, the fee transacting includes authorizing a debit of a deposit account, supplying an invoice, or processing the fee transaction via a payment system.

In another embodiment in accordance with the present invention, a computer implemented method for transacting intellectual property annuity, maintenance or renewal fee payments includes presenting, based on docket data, a user with a set of one or more intellectual property matters and associated annuity, maintenance or renewal fee payments; and in response to selection by the user of one or more of the matters and associated fee payments, initiating performance of the selected fee payments, and coincident therewith, initiating an associated payment transaction between the user and an intellectual property annuity, maintenance or renewal fee payment service.

In still another embodiment in accordance with the present invention, a method of operating an information service to facilitate fee transactions relating to intellectual property services includes registering for each of plural associates, at least one target jurisdiction and a computer readable encoding of fees for services performed by the associate therein; and distributing at least a subset of the registered target jurisdiction- and associate-specific fees to an intellectual property service user for use in transacting associated intellectual property services using a respective one or ones of the associates.

In still yet another embodiment in accordance with the present invention, an information system for transacting fees associated with intellectual property services includes a network and an intellectual property service portal. The network includes an originating node and plural target nodes. The target nodes correspond to associates licensed or otherwise authorized to perform intellectual property services in one or more target jurisdictions. The intellectual property service portal is coupled by the network to the originating and target nodes and is responsive to a selection at the originating node of at least one intellectual property service, supplying the originating node with particularized fees for the selected at least one intellectual property service. The intellectual property service portal is further responsive to initiation, from the originating node, of the selected at least one intellectual property service, transacting the particularized fees coincident therewith.

In still yet another embodiment in accordance with the present invention, a computer program product is encoded in a computer readable medium. The computer program product includes selection code and fee transaction code. The selection code is executable to select from amongst one or more intellectual property services supported by one or more information services therefor. The fee transaction code is executable to transact one or more fees associated with the selected one or more intellectual property services coincident with performance thereof by a corresponding one or ones of the information services. The selection code and fee transaction code may or may not be executable on the same processor.

In still yet another embodiment in accordance with the present invention, an intellectual property filing preparation system includes means for selecting from amongst one or more intellectual property services; means for initiating performance of the selected one or more intellectual property services; and means for transacting fees coincident with the performance of the selected one or more intellectual property services.

DESCRIPTION OF THE PREFERRED EMBODIMENT(S)

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENTS)

The invention is described herein with respect to various illustrative embodiments and implementation environments. Nonetheless, based on the description herein, persons of ordinary skill in the art will appreciate implementations suitable for other environments. The scope of the invention, as defined by the claims that follow, is not limited to any specific implementation environment.

Although one exemplary realization addresses the problem of servicing maintenance fee, annuity, renewal, tax or other payments (generally, annuity payments) and simultaneously (or near simultaneously) transacting related fees as between a payment service and a user of the payment service, other realizations apply similar techniques to the transacting of fees relating to performance of other intellectual property services such as the preparation and filing of target jurisdiction- and associate-specific papers on behalf of an intellectual property applicant or his representative. The illustrated set of intellectual property services is merely exemplary and, based on the descriptions herein, persons of ordinary skill in the art will appreciate a variety of realizations whereby fees are quoted and transacted coincident with performance of the particular intellectual property service.

Figure 1:
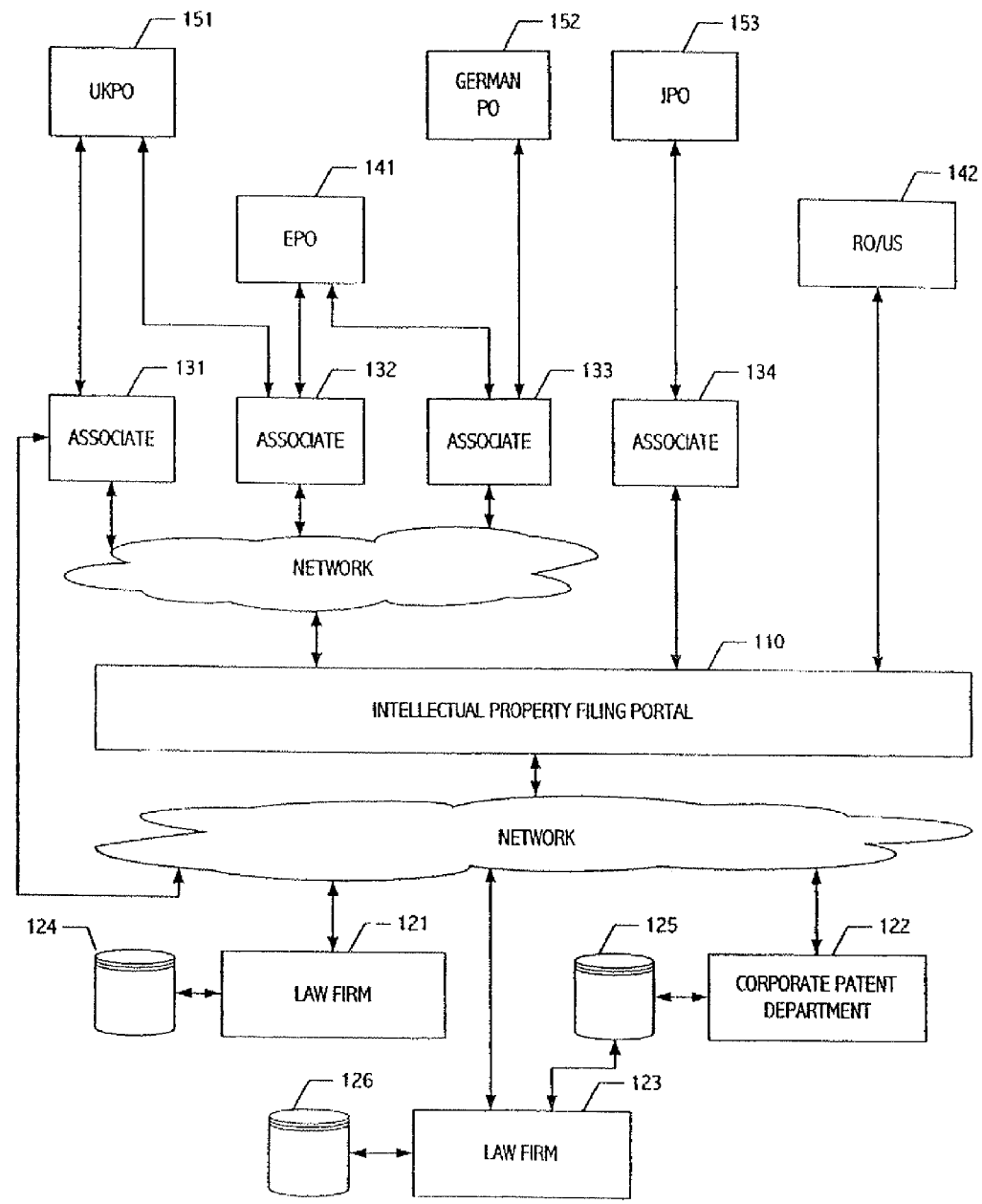
FIG. 1 is a block diagram depicting functional relationships between originating filers, an intellectual property filing portal, associates (including foreign attorneys and agents) and various patent-oriented intellectual property offices in accordance with an exemplary foreign-filing embodiment of the present invention.

FIG. 1 depicts an exemplary patent-oriented configuration of an international filing network in accordance with an exemplary embodiment of the present invention. Intellectual property filing portal 110 provides a central hub for facilitating filing transactions by associates (e.g., foreign associates and agents) in various patent-oriented intellectual property offices on behalf of originating filers (e.g., law firms, corporate patent departments and, in some configurations, applicants themselves). In general, associates (e.g., foreign associates and agents) register with intellectual property filing portal 110 to offer to originating filers (e.g., law firms and corporate patent departments) the service of filing counterpart foreign applications in respective jurisdictions where they are licensed or otherwise authorized to represent applicants. In an exemplary realization in accordance with FIG. 1, intellectual property filing portal 110 is hosted as a network accessible information service intermediary between computer systems of originating filers (e.g., originating filer systems 121, 122 and 123) and computer systems of service providing associates (e.g., associate systems 131, 132, 133 and 134): Alternatively, the intellectual property filing portal service provider may populate the intellectual property filing portal database of associates with requisite information about each associate, including the associate's name, address, including electronic mail address, telephone and facsimile numbers, as well as home page address, based on the service provider's own, knowledge or as available from published and other public information sources. As an option, originating filers may add specific associates to the intellectual property filing portal database using an associate data entry screen that queries the originating filer to provide the requisite information about the associate they wish to add, and in such instance, while the particular transaction would be consummated, the intellectual property filing portal service provider would be prompted to confirm the entry of the particular associate added by the originating filer into the intellectual property filing portal database of associates.

Originating filers select from amongst the target jurisdictions supported and from amongst associates offering filing services therein. Once target jurisdictions and associates are selected by an originating filer, transactions between the originating filer and its selected associates are performed largely electronically, via intellectual property filing portal 110. As will be described in greater detail below, intellectual property filing portal 110 supplies transaction specific fee information, target jurisdiction- and associate-specific form documents and, in some configurations, target jurisdiction filing requirements to originating filers. In some configurations, detailed instructions for completion of form documents and/or legalization of documents are also provided. Originating filers complete target jurisdiction- and associate-specific form documents and return them together with technical documents (e.g., the specification, claims, abstract and drawings of a patent application) for transmission to the corresponding selected associates for filing in a selected target jurisdiction or jurisdictions.

In some configurations, originating filer systems 121, 122 and/or 123 may retrieve matter specific information, technical documents, etc. in computer readable form from data stores (e.g., data stores 124, 125 and/or 126) to at least partially complete a set of filing documents. In general, such information and documents may be retrieved from local and/or remote stores, network information services, file servers, and/or applications with callable interfaces such as database management systems, docket systems, document management systems, etc. In some configurations (not specifically shown), at least some of such information and documents may be stored by intellectual property filing portal 110. For example, in one implementation, intellectual property filing portal 110 is integrated with a docket system. The docket system is a software system that is provided as a separate service. Originating filers who also subscribe to this separate docketing service would already have matter specific information stored in a database associated with or accessible by the intellectual property filing portal. This matter specific information is then used to populate target jurisdiction- and/or associate-specific form documents provided by the intellectual property filing portal database. Suitable realizations include subscription based services available or hosted by the intellectual property filing portal as well as on-customer-site docketing software with communication interfaces to the intellectual property filing portal.

To the extent that an originating filer is not a subscriber of the integrated docketing software but is a user of a third party docketing software, the intellectual property filing portal provides a data conversion utility, tool or other data access mechanism to import or otherwise retrieve data from the third party software database in a format to correctly populate the form documents provided from the intellectual property filing portal database.

In the configuration of FIG. 1, using software executing on originating filer systems 121, 122 and/or 123, matter specific information and technical documents can be automatically retrieved from data stores to populate the target jurisdiction- and associate-specific form documents with matter-specific information, and technical documents can be automatically formatted in accordance with jurisdiction-specific formal requirements supplied by intellectual property filing portal 110. In this way, a complete set of documents is prepared for each selected target jurisdiction including associate-specific filing papers, powers of attorney, authorizations, etc. Depending on the requirements of a particular selected jurisdiction, signature documents may be printed, signed, scanned and forwarded electronically (e.g., as a file transferred over the internet) with a complete set of filing documents. Alternatively, original signature documents may be printed, signed and physically delivered if necessary. In typical configurations, at least a portion of the set of filing documents is forwarded electronically by intellectual property filing portal 110 to information systems of the selected associates (e.g., associate systems 131, 132, 133 and/or 134). In some configurations, filing directly with an intellectual property office, e.g., with a competent receiving office under the Patent Cooperation Treaty, is provided when an associate/agent is either not required under applicable regulations or when an attorney or agent of the originating filer may himself or herself act as the agent for such a filing.

In an exemplary configuration, intellectual property filing portal 110 includes a network information service component, e.g., a web server, coupled via a communication network, e.g., the internet, to client applications, e.g., web browsers, of originating filers. Such client applications executing on originating filer systems 121, 122 and 123 typically communicate with intellectual property filing portal 110 over public data networks such as the internet using industry standard protocols, preferably using privacy enhanced protocols such as Secure Sockets Layer (SSL), HTTPS or with Virtual Private Networking (VPN); however, in some configurations or for some originating filer systems, dial-up communications, dedicated circuits or even physical transfer of computer readable media may be employed. A web server and browser based interface is presently preferred (1) for ease of use, (2) because information protocols, user interface techniques and information security implementations are mature and widely available for implementation of systems in accordance with the present invention, and (3) because of the increasingly ubiquitous nature of browser technology. However, other application interfaces, including custom interfaces, are also suitable. Based on the description herein, persons of ordinary skill in the art will appreciate suitable implementations using browser and non-browser based application platforms.

In addition, although some aspects of some configurations of intellectual property filing portal 110 are described herein in the context of a traditional client/server configuration, other realizations need not employ a client/server paradigm. Indeed, portions of the functionality described herein with reference to intellectual property filing portal 110 may be replicated and provided at originating filer systems 121, 122 and 123. For example, in one realization in accordance with some embodiments of the present invention, target jurisdiction- and associate specific form documents, fee schedules, requirements, etc. may be distributed to originating filer system installations. Distribution of such documents, schedules, requirements, etc. may be by periodic delivery of computer readable media (e.g., CD-ROM, disks, etc.) or through a network update facility. Alternatively, directory information (e.g., for associates and target jurisdictions for which the associates provide filing services) including Universal Resource Locators (URLs) and access credentials may be distributed to originating filer system installations and documents, schedules, requirements, etc. may be hosted by individual of the associate systems. Furthermore, combinations of the above described approaches may be employed. Based on the description herein, persons of ordinary skill in the art will appreciate suitable implementations for the particular needs of particular originating filer and associate communities.

In addition to the originating filer portion of an international filing network, FIG. 1 illustrates an exemplary associate and target jurisdiction portion thereof. For clarity of illustration and description, only a small number of associates and regional and national patent offices (e.g., United Kingdom Patent Office 151, European Patent Office 141, German Patent Office 152, Japanese Patent Office 153 and United States Patent and Trademark Office acting as the Receiving Office 142 under the Patent Cooperation Treaty for the United States) are represented. However, based on the description herein, persons of ordinary skill in the art will appreciate the advantages of much larger international filing networks, including at least one associate for each significant target jurisdiction and including larger numbers of associates for most target jurisdictions.

In general, an associate prepares filing papers (typically as form documents) and/or instructions for each of the jurisdictions for which it offers filing services. Form documents may be specific to the target jurisdiction, the associate or both. In addition, an associate typically supplies formal requirements (e.g., required document format, languages, applicant restrictions, etc.) for the target jurisdictions in which it offers its filing services and supplies fee schedule information including both its own fees and those applicable to the target jurisdictions. Preferably, target- and associate-specific requirements, including form documents, formal requirements and fee schedules are supplied in computer readable form by information systems of the respective associates to intellectual property filing portal 110 and maintained by the respective associates via a network. When a network communications interface is available, intellectual property filing portal 110 may forward at least a portion of the set of filing documents received from an originating filer system to the corresponding selected associate. However, where necessary, such requirements, form documents and fee schedules can be supplied in computer readable form by disk or other transfer mechanism or entered into data stores accessible to intellectual property filing portal 110 based on written materials received from the associate.

As illustrated in FIG. 1, a particular associate and hence a networked information server for such an associate (see e.g., associate system 132) may service filings for more than one target jurisdiction. Similarly, more than one associate and hence more than one networked information server may service a given target jurisdiction. For example, in the illustration of FIG. 1, associate system 132 offers filing services for the United Kingdom through UKPO 151 and for European Patent Convention filings through EPO 141. In contrast, associate 131 offers filing services only for the United Kingdom.

Typically, a law firm will have the option of interacting with intellectual property filing portal 110 both as an originating filer and as an associate. For example, the information systems 131 of an illustrated UK associate services filings into United Kingdom Patent Office 151 but also interacts with intellectual property filing portal 110 as an originating filer to allow filings via intellectual property filing portal 110 as described above (e.g., in German Patent Office 152 via information systems 133 of the illustrated German associate). Accordingly, although the intellectual property filing system is illustrated in the context of single direction flows of filings, persons of ordinary skill in the art will appreciate that, at least in some realizations, intellectual property filing portal 110 provides a fully bi-directional filing capability.

Figure 2:
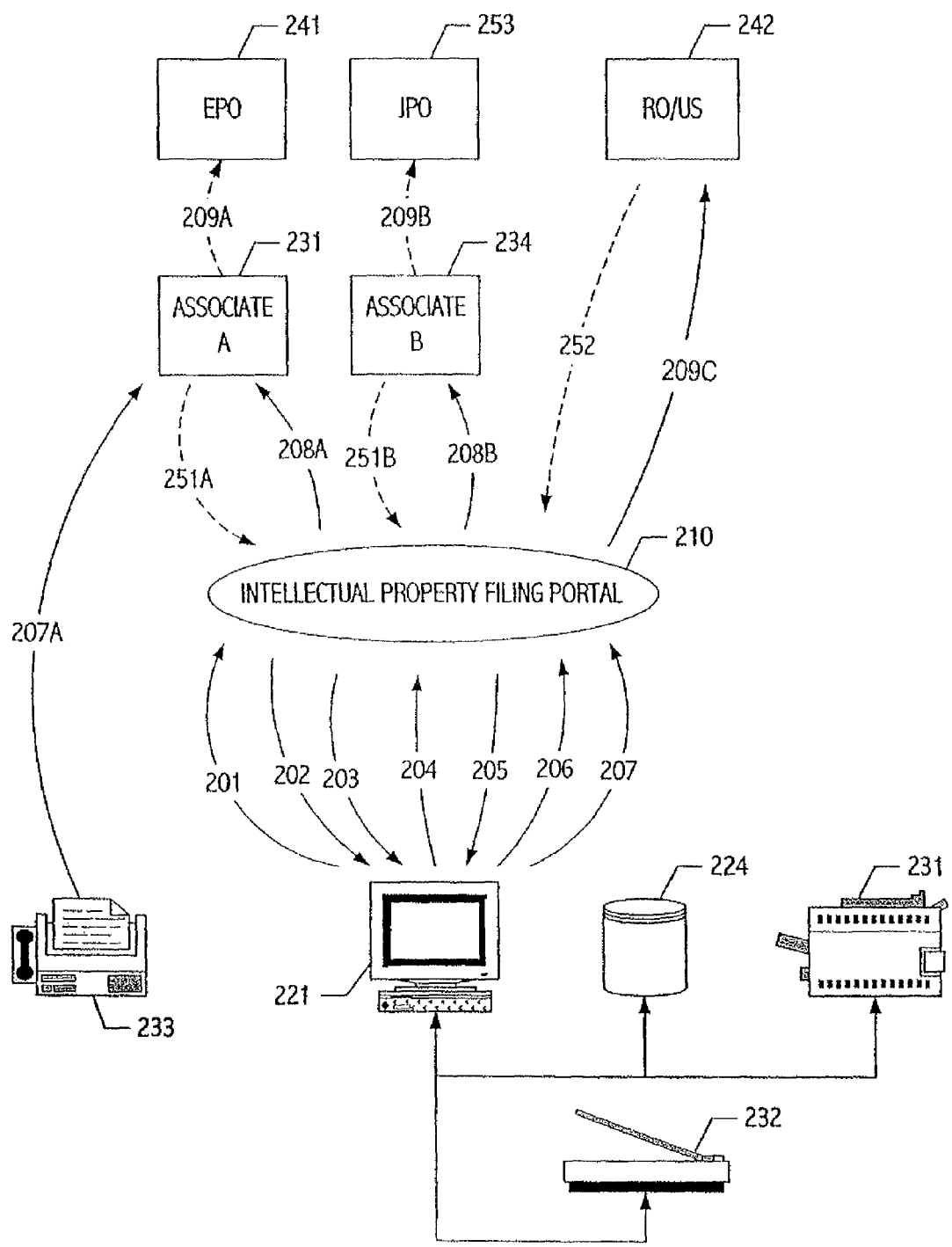
FIG. 2 depicts information flows between an originating computer system configuration, an intellectual property filing portal, associates (including foreign attorneys and agents) and various patent-oriented intellectual property offices in accordance with an exemplary embodiment of the present invention.

Referring now to FIG. 2, a single originating filer application is illustrated executing on workstation 221. In an illustrative configuration, the originating filer application communicates with an intellectual property filing portal 210 implemented as an information service executing on a networked information server via a communication network, e.g., World Wide Web, preferably a public, packet-switched data network with Virtual Private Networking (VPN) support. In the illustration of FIG. 2, two intellectual property filings are processed. Each is transacted via the network and intellectual property filing portal 210; however the first is filed with European Patent Office 241 and with Japanese Patent Office 253 after being transacted with information systems 231 and 234 of respective European and Japanese associates. The second is transacted without an associate intermediary and is filed directly in the United States Patent and Trademark office acting as receiving office under the Patent Cooperation Treaty.

A foreign filing session is initiated (201) by authenticating and requesting target jurisdiction and associate information from intellectual property filing portal 210. In response, intellectual property filing portal 210 supplies (202) a listing or other computer readable encoding of target jurisdictions and corresponding associates currently registered. For the sake of illustration, we assume that (as illustrated in FIG. 1) two associates are available for filings in the European Patent Office and a single associate is available for filings in the Japanese Patent Office. Further, we assume that virtually all significant regional and national offices are supported with at least one corresponding associate. Given these assumptions, intellectual property filing portal 210 may supply workstation 221 with a rather extensive listing of target jurisdictions and associates for presentation to the user. Possible selections may be presented to the user using any suitable user interface technology.

In some configurations, intellectual property filing portal 210 supplies or otherwise provides access to additional information that may facilitate selection, by a user at workstation 221, of particular associates and target jurisdictions. For example, intellectual property filing portal 210 may supply descriptive information for an associate as well as information such as summaries of national filing requirements and scope of protections available to facilitate evaluation by the user of foreign filing alternatives. Intellectual property filing portal 210 also supplies (203) fee and/or cost information descriptive of both target jurisdiction and associate fees and/or costs. Preferably, such information includes all fees and costs associated with filing a particular intellectual property application in the selected target jurisdiction. In some implementations, such information is parameterized with respect to particulars of the intellectual property filing, e.g., independent and total claim counts, page counts, designations (for regional or convention applications), applicant particulars, related matter particulars, subject matter categories, etc. In some implementations, estimates of prosecution costs may also be supplied.

In any case, based at least in part on information supplied by intellectual property filing portal 210, the user of workstation 221 selects (204) a particular set of target jurisdictions and corresponding associates for the filing of a particular intellectual property application. For example, in the illustrative case, the user selects one of the two available associates for filing in the European Patent Office (EPO) and selects the only available associate for filing in the Japanese Patent Office (JPO). In response to the user's selection (204), intellectual property filing portal 210 supplies (205) workstation 221 with target- and associate-specific requirements, including form documents, formal requirements and fee schedules for each of the selected associate and target jurisdiction combinations (in this case, for filing by associate A in the EPO and by associate B in the JPO).

Typically, formal documents are supplied in a computer readable encoding such that application software on workstation 221 may populate the formal documents with matter specific data (e.g., docket data, originating agent data, etc.) retrieved from a data store. As before, particular implementations may employ local and/or remote stores, network information services, file servers, and/or applications with callable interfaces such as database management systems, docket systems, document management systems, etc. in the role of data store 224. In some configurations in accordance with the present invention, preparation of formal documents based on matter specific data is automated and occurs with little or no user interaction subsequent to the selection (204) of target jurisdictions and corresponding associates. In other configurations, at least some manual entry of data into the form documents may be required. In either case, once formal documents are finalized (either automatically or with manual intervention), the user authorizes (206) the intellectual property filings in the selected target jurisdictions using the selected associates.

Coincident with the authorization, application software executing on workstation 221 transmits (207) at least some of the filing documents to intellectual property filing portal 210. Preferably, all filing documents (including completed and digitally signed formal documents and technical documents retrieved from data store 224) are transmitted to intellectual property filing portal 210. However, in some configurations, some of the documents are printed (e.g., using printer 231), signed and transferred in hardcopy form to the corresponding associate. In situations where original signatures are required, an overnight courier may be employed. Alternatively, if consistent with the requirements of a particular target jurisdiction, signed formal papers may be faxed (233), or scanned (232) and transmitted electronically, to the corresponding associate.

Intellectual property filing portal 210 receives (207) the user's authorization (including a fee authorization) and at least some of the filing documents from workstation 221 and, in turn, forwards (208A, 208B) a respective one (or ones) of the filing documents to the appropriate associates for filing. Preferably, the forwarding is in computer readable form so that, if available in the corresponding target jurisdiction, filings can be made electronically by the corresponding associates. However, for at least some associates and presently for all patent offices, it is expected that filing documents will be transmitted in hard copy form. Intellectual property filing portal 210 maintains as part of its associate registrations a computer readable encoding of suitable transmission means.

In a representative configuration, target- and associate-specific requirements, including form documents, formal requirements and fee schedules supplied (205) by intellectual property filing portal 210 are previously supplied (251A, 251B) in computer readable form by respective associates. Alternatively, such information may be maintained by the respective associates and retrieved on demand by intellectual property filing portal 210 in response a particular user's foreign filing session. Suitable storage configurations for target- and associate-specific requirements data may vary from associate to associate.

Associate data, including name, address, registration numbers, e-mail or other electronic information service address, telephone and facsimile numbers, etc. may be supplied by the intellectual property filing portal to populate a generic set of form documents for each of the selected target jurisdictions. Alternatively, or for at least some associates and/or jurisdictions, form documents particular to a specific associate may be obtained by, or stored in a data store accessible to, the intellectual property filing portal.

Figure 3:
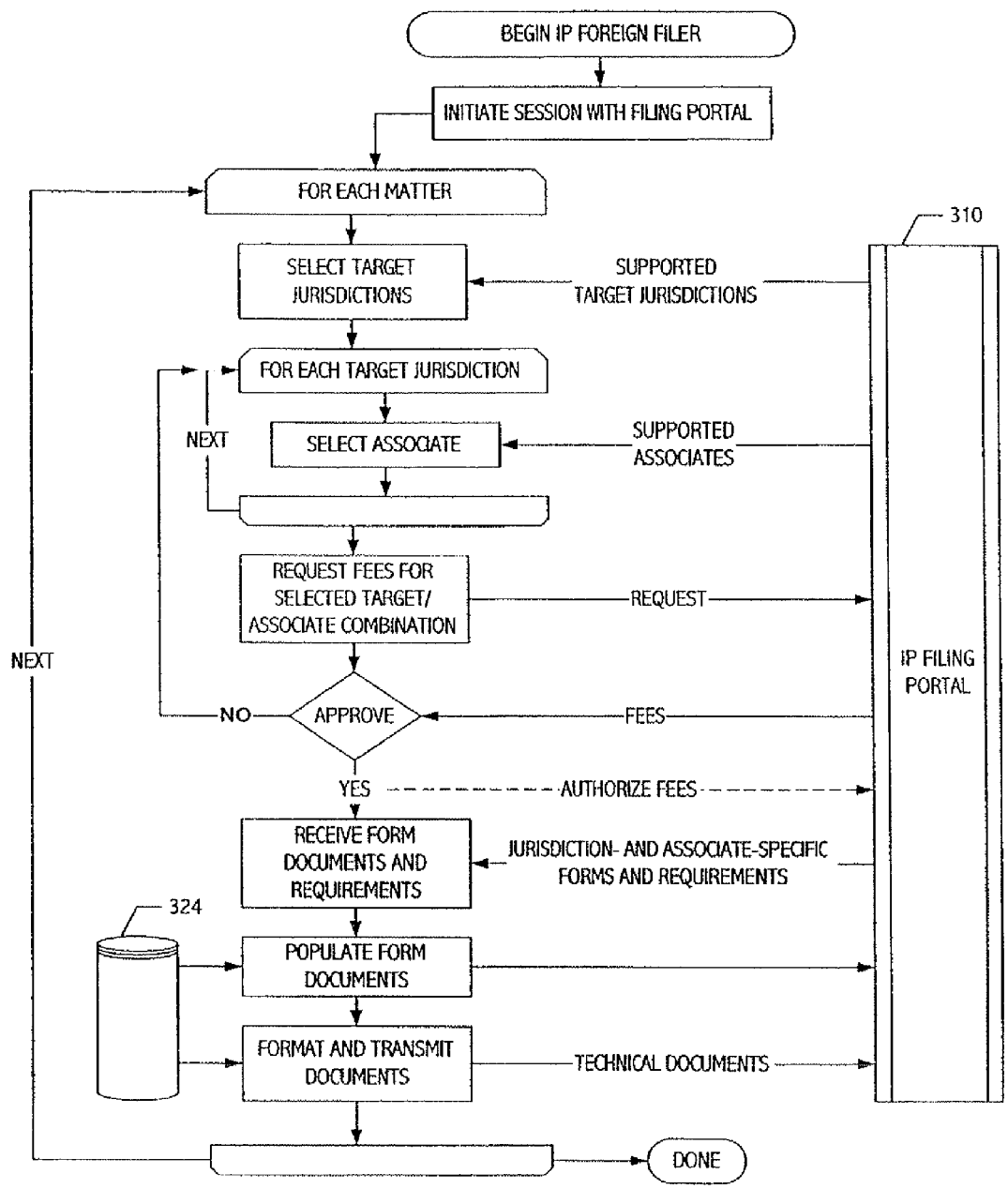
FIG. 3 is a flow chart illustrating a control and data flows within and between an originating information system and an intellectual property filing portal in accordance with an exemplary interaction between the originating information system and the intellectual property filing portal.

FIG. 3 illustrates exemplary originating filer side data and control flows in an intellectual property filing configuration in accordance with an embodiment of the present invention. Specifically, after initiating a session with the filing portal, the originating filer side application performs, for each matter to be foreign filed, a selection of target jurisdiction and of associate. In each case, an encoding of target jurisdictions and associates is supplied by intellectual property filing portal 310. Once target jurisdictions and associates are selected, the originating filer side application requests corresponding fee quotations. If the fees quoted by intellectual property filing portal 310 are approved, a fee transaction is authorized (e.g., by debit account, wire transfer, etc.) and preparation of formal document is begun. If not, the user may reselect target jurisdiction and/or associates. Assuming that fees are approved and that the fee transaction is successful, the intellectual property filing portal 210 sends, and the originating filer application receives, jurisdiction- and associate-specific forms and requirements for each of the selected target jurisdiction and associate combinations. As before, form documents and requirements are supplied in computer readable form to facilitate automated preparation of documents by the originating filer application.

Typically, the received form documents are populated with information from a local data store (e.g., docket data and priority document data store 324). Because the form documents are target jurisdiction- and associate-specific, once completed (i.e., populated with data) and signed, they are suitable for filing with technical documents by the associate in the target jurisdiction. In some cases, particular formal requirements may affect technical documents as well. In such cases, the received computer readable encoding of formal requirements allows the originating filer-side application to perform minor formatting on patent application data (e.g., on a target-neutral computer readable encoding of a priority application). For example, margins and page numbering may be conformed to the formal requirements. In addition, for technical documents encoded in target neutral formats that encode metadata (e.g., as SGML/XML tags), section headings may be conformed to formal requirements as well. Alternatively, in some configurations, the originating filer-side application may prompt the user to make changes manually in accordance with the received formal requirements. In any case, technical documents and, now completed, target jurisdiction- and associate-specific form documents are transmitted to intellectual property filing portal 310 for forwarding on to the selected associates for filing.

When a set of filing documents is received from the originating filer, the intellectual property filing portal determines (based on service availability or preferences) whether to forward the filing documents to respective associates via an electronic information transfer (e.g., using e-mail, ftp or any other suitable information transfer mechanism or protocol) or in facsimile form. In general, if an associate has an electronic address, an electronic transfer of information in computer readable form is preferred. However, if the associate does not have an electronic address, then the intellectual property filing portal may select an alternate delivery mechanism. For example, in such a case, the intellectual property filing portal may search for the facsimile number corresponding to the associate, and send the filing documents as a facsimile transmission to the associate's facsimile. The confirmation of receipt by the intellectual property filing portal and the receipt that the originating filer will receive from the intellectual property filing portal can be the normal facsimile confirmation message that a certain number of pages have been received by the associate's facsimile machine. In the event that the associate's facsimile machine is busy, the intellectual property filing portal will continue to transmit the facsimile at regular intervals, e.g., every five minutes, until the facsimile transmission is either complete or the number of attempts reach a certain number of attempts (user defined with default of X number of times) at which point the intellectual property filing portal will contact both the originating filer and the intellectual property filing portal administrator for corrective action.

As previously described, the entire set of filing documents is preferably encoded in computer readable form and transmitted electronically to intellectual property filing portal 310. However, for some target jurisdictions, at least some of the formal documents may need to be printed, signed and transmitted. In some cases, a scanned image of the signed document(s) may be acceptable. Accordingly, in such cases, the scanned image of the signed document(s) is transmitted in electronic form with the set of filing documents. While it is possible in some realizations to have the intellectual property filing portal print out instructions for the originating filer to send the executed formal documents directly to the associate via mail or facsimile, it is generally preferred for the executed document to be scanned and attached (e.g., as an image file or other encoding) to, or otherwise associated with, the set of electronic documents sent to the particular associate. In this way, transaction tracking by the intellectual property filing portal is improved. Nonetheless, some realizations may allow separate, later delivery (e.g., by mail or courier) of documents such as those requiring original signatures, notarization, legalization, certification, imprints, seals or other indicia of authenticity not susceptible to electronic capture and transmission.

Figure 4:
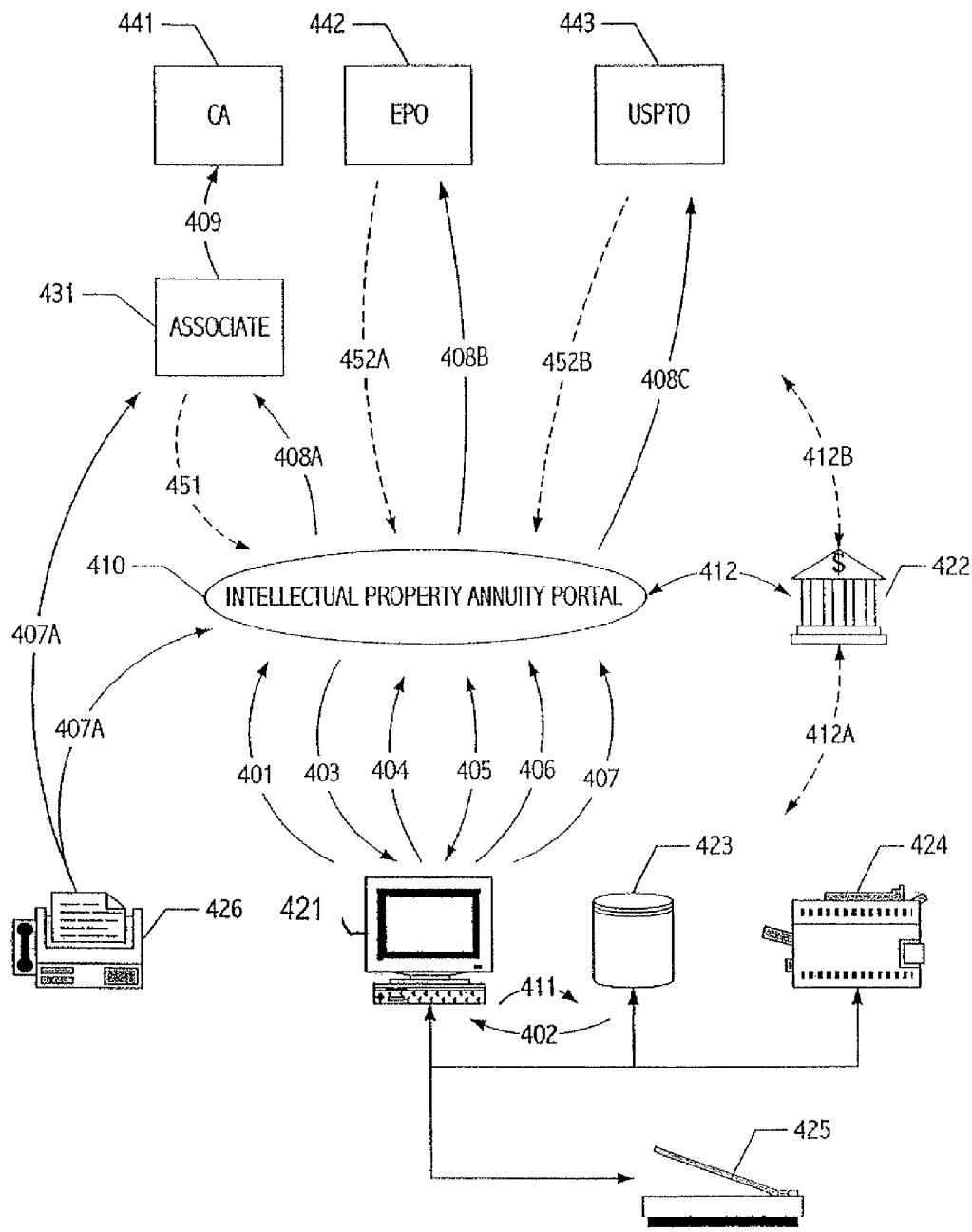
FIG. 4 depicts information flows between an originating computer system configuration, an intellectual property annuity portal, payment systems, associates (including foreign attorneys and agents) and various patent-oriented intellectual property offices in accordance with an exemplary embodiment of the present invention.

Referring now to FIG. 4, a single annuity payment application is illustrated executing on workstation 421. In an illustrative configuration, the annuity payment application communicates with an intellectual property annuity portal 410 implemented as an information service executing on a networked information server via a communication network. In general, intellectual property annuity portal 410 may simultaneously support multiple annuity payment applications. As before, the communication network preferably includes a public, packet-switched data network with Virtual Private Networking (VPN) support. In the illustration of FIG. 4, three annuity payments are processed. Each is transacted via the network and intellectual property annuity portal 410; however the first is destined for Canadian Patent Office 441 via the information system 431 of a selected Canadian agent. The second and third are made without an associate intermediary in European Patent Office 442 and US Patent and Trademark Office 443, respectively.

An annuity payment session is initiated (401) by authenticating and requesting supported payment types as well as target jurisdiction and associate information from intellectual property annuity portal 410. In response, intellectual property annuity portal 410 supplies (403) a listing or other computer readable encoding of supported payment types, target jurisdictions and corresponding associates currently registered with the portal. In some realizations, a variety of payment types (including maintenance fee, annuity, renewal, tax, workings or other payments) are supported for regional and national offices either directly or (if required) using a designated agent. Accordingly, intellectual property annuity portal 410 may supply workstation 421 with a rather extensive listing of payment types, target jurisdictions and associates for presentation to the user. Possible selections may be presented to the user using any suitable user interface technology.

In some realizations, intellectual property annuity portal 410 initially supplies or otherwise provides access to additional information that may facilitate annuity payment decisions. For example, intellectual property annuity portal 410 may initially supply (403) fee and/or cost information descriptive of current fee amounts in the various target jurisdictions and any associate fees and/or costs and charges associated with use of intellectual property annuity portal 410. In some implementations, such information is parameterized with respect to particulars of a particular intellectual property or application, e.g., independent and total claim counts, page counts, designations (for regional or convention applications), applicant particulars, related matter particulars, subject matter categories, etc.

Based on data retrieved (402) from a database, e.g., that of docket system 423, the annuity payment application identifies payments meeting user definable temporal or other criteria (e.g., client, payment type, due date, etc.) and presents the user with a set of payments for selection (or deselection). In realizations in which parameterized fee data is supplied, the annuity payment application may also calculate and present exact or estimated fees to facilitate user decisions. Based on this presentation, the user of workstation 421 selects (404) a particular set of payments to be made in target jurisdiction(s). Where required, the selection includes a designated agent as an associate. In the illustrated case, the user selects three payments from amongst three or more possible payments matching the user definable criteria. In particular, the user selects a first payment (e.g., for an application pending in the Canadian Patent Office), a second payment (e.g., for an EPC application pending in the European Patent Office) and a third payment (e.g., for a issued U.S. patent). In response to the user's selection (404), intellectual property annuity portal 410 may selectively supply (405) workstation 421 with target- and associate-specific form documents such as powers of attorney, if required. In some realizations, fee and/or cost information initially supplied (e.g., at 403) is now confirmed or more precisely calculated and supplied (405) to workstation 421.

In any case, the user authorizes (406) the making of the selected set of payments. Fees are transacted (412) as between the authorizing user (or his/her organization) and intellectual property annuity portal 410 coincident with the authorization. In some realizations, the transaction is initiated (412A) from workstation 421. In others, transaction is initiated from intellectual property annuity portal 410 in response to authorization 406. In general, fees are transacted using a payment system 422 which may include pre-authorized electronic funds transfers between financial institutions, credit card authorizations, etc. In some realizations, fees are transacted at least in part by debiting a user's deposit account or accounts with the intellectual property annuity portal organization and/or with a particular target jurisdiction or associate. In some realizations, payment systems may include target jurisdictions and/or associates and payments to particular target jurisdictions and associates may also be made (4128) coincident with authorization 406. However, in other realizations, authorized payments may be made independently or through alternate payment system facilities.

Typically, form documents, if any, are supplied in a computer readable encoding such that application software on workstation 421 may populate the documents with matter specific data (e.g., docket data, originating agent data, etc.) retrieved from a data store. As before, particular implementations may employ local and/or remote stores, network information services, file servers, and/or applications with callable interfaces such as database management systems, docket systems (e.g., docket system 423), document management systems, etc.

In some realizations, software executing on workstation 421 transmits (407) target jurisdiction- and/or associate-specific documents (e.g., executed powers of attorney) to intellectual property annuity portal 410 coincident with authorization 406. Preferably, such documents are transmitted to intellectual property annuity portal 410 in electronic form. However, in some configurations, some of the documents are printed (e.g., using printer 424), signed and transferred in hardcopy form to the intellectual property annuity payment facility or corresponding associate. In situations where original signatures are required, an overnight courier may be employed. Alternatively, if consistent with the requirements of a particular target jurisdiction, signed formal papers may be faxed (407A), or scanned (425) and transmitted (407) electronically, to intellectual property annuity portal 410 or to the corresponding associate. Preferably, signed formal papers are scanned and transmitted in a manner that unambiguously associates them with authorization 406. For example, in one suitable realization, transmission 407 and authorization 406 are implemented as a single combined information transaction. In one such implementation, a scanned image (or images) of signed formal papers is (are) supplied as an attachment to authorization message encoded as email.

Intellectual property annuity portal 410 receives (407) the user's authorization from workstation 421 and, in turn though not necessarily immediately, initiates payments (e.g., 408B and 408C) in the target jurisdictions corresponding to selected payments. In situations where an authorized in-country agent is required, payment may be initiated (e.g., 408A) via the selected associate (e.g., 431). Preferably, each of the payments is initiated in electronic form although any payment system is generally suitable for transactions as between intellectual property annuity portal 410 and the target jurisdiction or associate. However, for at least some associates and presently for all patent offices, it is expected that payments will initially be transacted using conventional means. Intellectual property annuity portal 410 maintains as part of its associate registrations a computer readable encoding of suitable transmission means.

In a representative configuration, target- and associate-specific form documents, formal requirements and fee schedules supplied (403, 405) by intellectual property annuity portal 410 are registered (e.g., 451) with intellectual property annuity portal 410 in computer readable form by respective associates. For target jurisdictions, similar registrations (e.g., 452A, 452B) are performed based on target jurisdiction fees and requirements. Alternatively or eventually, such information may be maintained by the respective associates and retrieved on demand by intellectual property annuity portal 410 in response to a particular user's annuity session. Suitable storage configurations for target- and associate-specific requirements and fee data may vary from associate to associate.

Figure 5:
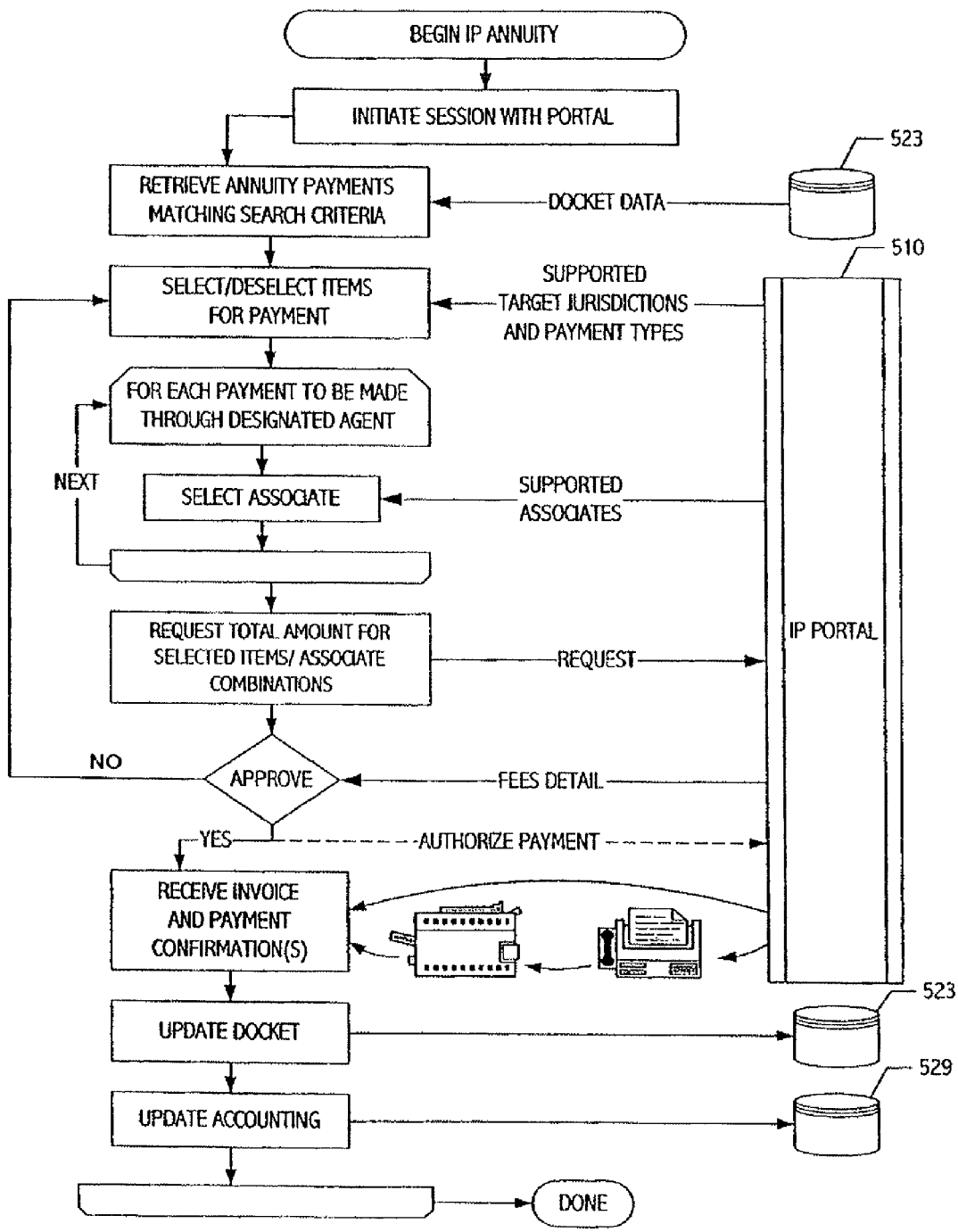
FIG. 5 is a flow chart illustrating a control and data flows within and between an originating information system and an intellectual property annuity portal in accordance with an exemplary interaction between the originating information system and the intellectual property annuity portal.

FIG. 5 illustrates exemplary user-side application data and control flows in an intellectual property annuity payment configuration in accordance with an embodiment of the present invention. Specifically, after initiating a session with the annuity payment portal, the user-side application retrieves information from docket database 523 to provide a set of payments which the user may select for execution. Using information from intellectual property annuity portal 510 that identifies supported target jurisdictions and payment types, the user selects a subset of items for payment. If required, the user-side application requires the user to select from supported associates to act as in-country agents. Once a set of payments and associates (if required) have been selected, the originating filer side application requests corresponding fee quotations. If the fees quoted by intellectual property annuity portal 510 are approved, a fee transaction between user and intellectual property annuity portal 510 is authorized (e.g., by debit account, wire transfer, etc.) and the selected payment(s) is (are) initiated. If not, the user may alter his selection of items for payment.

Optionally, the intellectual property annuity portal 510 sends, and the user-side application receives, any jurisdiction- and associate-specific forms (e.g., power of attorney forms) necessary to complete the selected payments in the selected target jurisdictions. As before, form documents and requirements are supplied in computer readable form to facilitate automated preparation of documents by the user-side application. As previously described, completed form documents are preferably encoded in computer readable form and transmitted electronically to intellectual property annuity portal 510. However, for some target jurisdictions, at least some of the formal documents may need to be printed, signed and transmitted in hard copy form. Alternatively, electronically transmitted facsimiles may be suitable.

Assuming that fees are approved and that the fee transaction is successful, the intellectual property annuity portal 510 sends, and the user-side application receives, invoices and payment confirmations. As before, invoices and payment confirmations are preferably encoded in computer readable form and transmitted electronically by intellectual property annuity portal 510. Electronic payment confirmations are used by intellectual property annuity portal 510 to update docket system 523. Similarly, electronic invoices may optionally be used to update accounting system 529 and in law firm environments, drive client billing systems.

While the invention has been described with reference to various embodiments, it will be understood that these embodiments are illustrative and that the scope of the invention is not limited to them. Many variations, modifications, additions, and improvements are possible and will be appreciated by persons of ordinary skill in the art based on the description herein. For example, although patent intellectual property filings have been used to facilitate description of features, advantages and capabilities with respect to specific filing situations, realizations in accordance with the present invention may be configured to support other intellectual property filings (e.g., to secure trademarks or copyrights). Some realizations may support filings for multiple forms of intellectual property. Some realizations need not include support for patent intellectual property filings. Also, although application filings have been described for illustrative purposes, embodiments in accordance with the present invention may be configured to include other filings such as during prosecution of an application or post issuance. Similarly, although foreign filings have been emphasized, some configurations in accordance with the present invention may be employed to facilitate filing networks wholly within a single country.

More generally, plural instances may be provided for components described herein as a single instance. Boundaries between various components, services, applications, and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. Similarly, structures and functionality presented as a single component may be distributed amongst plural components. Persons of ordinary skill in the art will appreciate allocations of structures and functionality suitable to particular implementation environments, interface constraints and desired product and/or service configurations. These and other variations, modifications, additions, and improvements may fall within the scope of the invention as defined in the claims that follow.

What is claimed is:

1. A computer implemented method for transacting an intellectual property service in connection with the filing of documents and/or payment of fees for intellectual property matters relative to a target jurisdiction, the method comprising:

presenting, by a computer, a user with a target jurisdiction, an associate for said target jurisdiction, and fees associated with a particular intellectual property service, the fees being particularized by both target jurisdiction and said associate;

providing, by the computer, responsive to determining an intellectual property matter, information representative of one or more fees specific to the intellectual property, wherein the fees include one or more of: official fees, and service fees, and wherein the fees for a combination of the same particular intellectual property service and the same associate in the same target jurisdiction differ from intellectual property matter to intellectual property matter; and automatically initiating, by the computer, responsive to selection by the user, performance of the intellectual property service for the intellectual property matter.

2. The method of claim 1, wherein the intellectual property service includes one or more of paying an annuity or maintenance fee, making an intellectual property filing on behalf of the user, and preparing and/or filing target jurisdiction- and associate-specific documents for directing and/or effecting the filing and/or payment thereof.

3. The method of claim 1, and substantially coincident with the performance, transacting the one or more fees specific to the intellectual property, wherein the fee transacting includes one or more of authorizing a debit of a deposit account, supplying an invoice, and processing the fee via a payment system.

4. The method of claim 1, further comprising determining the intellectual property matter responsive to a docket event, and automatically initiating the providing of information representative of the intellectual property services in response to the docket event for the particular intellectual property matter corresponding thereto.

5. The method of claim 1, further comprising:
retrieving information characterizing an intellectual property application corresponding to the one or more intellectual property matters from a data store;
the associated one or more fees provided to the user being automatically calculated by a computer, including retrieving information characterizing an intellectual property application corresponding to the one or more intellectual property matters from a data store and referring to at least a portion of the intellectual property application information to determine the associated one or more fees.

6. The method of claim 1, further comprising supplying information encoding the intellectual property service, the fees associated with the particular intellectual property service, and the one or more fees specific to the intellectual property, for use in an accounting system.

7. The method of claim 1, further comprising transacting, substantially coincident with the performance of the intellectual property service, the associated one or more fees.

8. The method of claim 1, further comprising transacting, prior to the performance of the intellectual property service, the associated one or more fees.

9. The method of claim 1, wherein the one or more intellectual property matters relate to a plurality of jurisdictions, and wherein the information is further particularized by the one or more intellectual property matters.

10. The method of claim 1, further comprising retrieving information characterizing an intellectual property application corresponding to the intellectual property matter from a data store; and at least partially completing target jurisdiction- and associate-specific documents for the services from the retrieved information.

11. A method of operating an information service to facilitate fee transactions in connection with the filing of documents and/or payment of fees relating to intellectual property services in one or more target jurisdictions, the method comprising:
registering for each of plural associates, at least one target jurisdiction and a computer readable encoding of fees for one or more intellectual property services performed by the associate therein;
distributing information representative of one or more of the target jurisdictions, and one or more associates registered therefore and corresponding fees, to a user for use in transacting at least one of the intellectual property services using a respective one or ones of the associates; and
automatically determining, by the computer, responsive to selection by the user of one or more specific intellectual property matters in combination with one or more of the target jurisdictions and/or associates, matter-specific fees, including referencing the encoding of fees, and providing, to the user, the matter-specific fees, wherein the matter-specific fees for a combination of the same specific intellectual property matter and the same associate in the same target jurisdiction differ from intellectual property matter to intellectual property matter.

12. The method of claim 11, wherein the distributing is responsive to selection by the user of one or more of the target jurisdictions and, for each selected target jurisdiction, a respective one or ones of the associates.

13. The method of claim 11, wherein the distributing includes supplying, on a periodic basis, to the user, of the computer readable encoding of fees.

14. The method of claim 11, wherein the distributing is encoded by a transmittal in at least one computer readable medium selected from the set of a disk, CD-ROM, tape or other magnetic, optical, or electronic storage medium and a network, wireline, wireless or other communications medium.

15. The method of claim 11, further comprising
registering forms, for each of plural associates, for the at least one jurisdiction, for use in directing the filing of documents and/or payment of fees in the jurisdictions;
distributing to a user, responsive to selection of respective one or more associates, at least a portion of the respective forms; and,
responsive to receipt of at least partially completed forms from the user, forwarding the at least partially completed forms to the respective one or more associates.

16. A non-transitory computer program product encoded in a computer readable medium for transacting an intellectual property service in connection with the filing of documents and/or payment of fees relative to one or more target jurisdictions, the computer program product comprising:
selection code executable by a computer to select from amongst one or more intellectual property services supported by one or more information services therefore and to automatically, by the computer, in response to the selection of the intellectual property service, initiate performance of the selected one or more intellectual property services relative to one or more particular intellectual property matters;
fee transaction code executable to automatically transact, by the computer, one or more fees associated with the selected one or more intellectual property services and one or more particular intellectual property maters substantially coincident with performance of the one or more intellectual property services by a corresponding one or ones of the information services; and instruction code executable by the computer to present a user with one or more target jurisdictions and one or more respective associates for each of at least a portion of said target jurisdictions, the one or more fees associated with a particular one or ones of the intellectual property services being further particularized by target jurisdiction and/or said one or more respective associates, and one or more particular intellectual property matters.

* * * * *